(12) United States Patent
Franks

(10) Patent No.: US 6,611,684 B1
(45) Date of Patent: Aug. 26, 2003

(54) METHOD AND APPARATUS FOR IMPLEMENTING CUSTOMER GROUP FUNCTIONALITY IN A WIRELESS ENVIRONMENT

(75) Inventor: Gary Steven Franks, Chapel Hill, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/209,126

(22) Filed: Dec. 10, 1998

(51) Int. Cl.[7] ............................. H04B 7/20; H04Q 7/00
(52) U.S. Cl. ................................. 455/433; 455/518
(58) Field of Search .................................... 455/433, 435, 455/432, 518, 519, 520, 414, 428, 426

(56) References Cited

U.S. PATENT DOCUMENTS

| | | | | |
|---|---|---|---|---|
| 5,200,954 A | * | 4/1993 | Teel, Jr. et al. | 370/94.1 |
| 5,440,541 A | * | 8/1995 | Iida et al. | 370/352 |
| 5,564,071 A | * | 10/1996 | Liou et al. | 455/520 |
| 5,724,648 A | * | 3/1998 | Shaughnessy et al. | 455/519 |
| 5,867,498 A | * | 2/1999 | Gillman et al. | 370/385 |
| 5,920,820 A | * | 7/1999 | Qureshi et al. | 455/461 |
| 5,956,640 A | * | 9/1999 | Eaton et al. | 455/432 |
| 6,094,660 A | * | 7/2000 | Glitho | 707/104 |
| 6,097,942 A | * | 8/2000 | Laiho | 455/414 |
| 6,097,963 A | * | 8/2000 | Boltz et al. | 455/433 |
| 6,115,613 A | * | 9/2000 | Jonsson | 455/414 |
| 6,134,313 A | * | 10/2000 | Dorfman et al. | 379/201 |
| 6,173,171 B1 | * | 1/2001 | Plush et al. | 455/408 |

* cited by examiner

Primary Examiner—Charles N. Appiah
(74) Attorney, Agent, or Firm—Nortel Networks

(57) ABSTRACT

A method for implementing customer group functionality in a wireless environment. A group table can contain group data associated with a group of wireless subscriber stations. A subscriber table can contain subscriber data for a plurality of wireless subscriber stations. A request is received from a network element for information relating to a wireless subscriber station. Subscriber data associated with the wireless subscriber station is obtained from the subscriber table, and group data referenced by the subscriber data is obtained from the group table. A message including information based at least in part on the contents of the group data referenced by the subscriber data is sent to the network element.

15 Claims, 10 Drawing Sheets

METHOD AND APPARATUS FOR IMPLEMENTING CUSTOMER GROUP FUNCTIONALITY IN A WIRELESS ENVIRONMENT

FIELD OF THE INVENTION

This invention relates generally to wireless telecommunications services, and in particular to implementing customer group functionality in a wireless environment.

BACKGROUND OF THE INVENTION

When wireline (sometimes referred to as landline) telephone service is sought from a local telephone service provider, an employee of the telephone company obtains from the customer the relevant information necessary to implement the desired service. Such information can include billing information, contact information, and the particular features, such as call waiting, call forwarding, and calling number identification presentation, which the subscriber would like set up for their phone. This information is then used to 'provision' the appropriate equipment. The provisioning process generates an electronic subscriber 'profile' that contains relevant information relating to the subscriber, and which is used by the wireline equipment to implement the desired service for the subscriber. This process, from the information acquisition stage through the provisioning stage, is relatively labor intensive and consequently costly for the service provider.

In some circumstances, a large number of subscribers may be provisioned for identical services. For example, when a company sets up a new facility, hundreds or even thousands of telephones may need to be provisioned for service with a service provider, and each telephone may have associated with it the same, or substantially the same, services. The use of a 'customer group' can ease what might otherwise be a substantial manual effort in entering identical information in the profile of each subscriber. A customer group contains a group profile for a group of subscribers having a set of common services, or features. Each subscriber in the group receives the features activated in the customer group profile, even if the feature is not activated in the subscriber's individual profile. For example, each subscriber associated with a particular customer group can be provisioned with call waiting by provisioning the group profile, without having to modify each subscriber's individual profile. The use of a customer group can greatly reduce the labor that would otherwise be required to similarly provision a large number of subscribers. Moreover, it helps ensure uniformity of features for each individual line.

The popularity of wireless telecommunications services is growing rapidly, at least in part because of decreasing subscription costs due to competition among providers. As the market matures, it is becoming increasingly important for such providers to distinguish themselves on items other than costs, such as, for example, on the different services they can offer a subscriber.

Customer group functionality is typically not available in wireless services. This is in part because call processing in the wireless arena is more complicated than call processing in the wireline arena. In wireline telecommunications, calls placed by the same subscriber always originate at the same switch. Thus, services provisioned for a subscriber need only be stored in one location, i.e., the switch that originates the subscriber's call. When processing the call, the switch is programmed to check the calling party's subscriber profile to determine feature availability, and if the subscriber profile indicates customer group membership, the switch also acquires the appropriate customer group profile.

In contrast, in wireless call processing, the particular mobile switching center (MSC) that provides service to the calling (wireless) party can differ depending on the location of the wireless subscriber. In the wireless world, a home location register (HLR) associated with a particular subscriber maintains the subscriber's profile, which includes billing information and the features provisioned for that subscriber, as well as the current location of the subscriber. Each mobile switch is associated with a visitor location register (VLR). When an MSC determines that a wireless subscriber station has come within the service area of the switch, a message is sent to the HLR of the subscriber requesting the subscriber's profile. This information is then stored in the VLR associated with the MSC. The protocol for communications between an HLR and a VLR is typically either IS-41, or GSM. Neither IS-41 nor GSM include messages specifically designed to provide customer group functionality.

It is becoming increasingly common for companies to offer wireless phones to a group of its employees, such as the sales force, for example. Typically each member within the group will have substantially the same features, such as calling number identification presentation, call waiting, distinctive ringing, or other such features. It would be desirable for the wireless service provider to be able to provision a single customer group with the requested features rather than having to modify each individual subscriber's profile, both to simplify the provisioning process and to ensure uniformity of services across all subscribers in the group.

Thus, it is apparent that it would be desirable to provide customer group functionality in the wireless telecommunications environment.

SUMMARY OF THE INVENTION

To achieve the foregoing and in accordance with the purposes of the present invention, a method and system for implementing customer group functionality in a wireless environment are provided. The present invention eases service provider provisioning processes, reducing labor costs and ensuring uniformity of services over a specified group of subscriber stations.

A group table that is operative to contain group data associated with a group of wireless subscriber stations is established in, for example, an HLR. The HLR also contains a subscriber table that is operative to contain subscriber data for several wireless subscriber stations. The subscriber data for a respective wireless subscriber station includes feature data. A request is received from a network element, such as a mobile switch or VLR for example, for information relating to a wireless subscriber station. The subscriber data associated with the wireless subscriber station is obtained from the subscriber table. Group data referenced by the subscriber data associated with the wireless subscriber station is obtained from the group table. In response to the request from the network element, a message including information based at least in part on the content of the group data referenced by the subscriber data is sent by the HLR to the network element.

According to one embodiment of the present invention, the group data maintained in the group table includes feature data associated with a group of wireless subscriber stations. The information sent to the network element includes unified feature data that is derived from the feature data from the subscriber data associated with the wireless subscriber station and the feature data from the group data referenced by the subscriber data. The feature data can indicate whether a respective feature, such as calling number identification presentation or call waiting is enabled. The unified feature data can be derived by examining the feature data from the subscriber data and the feature data from the group data. If the respective feature is indicated as enabled in at least one of the subscriber data and the group data, the unified feature data for the respective feature is indicated as enabled. The information can be sent to the network element by a home location registration (HLR) associated with the respective wireless subscriber station. By creating unified feature data from the subscriber and group feature data, and sending such information in a message to the network element, the standard protocols, such as IS-41 and GSM need not be modified to implement customer group functionality in a wireless environment according to the present invention. Further, the mobile switch and/or VLR need not be modified to implement customer group functionality in the wireless environment.

According to another embodiment of the present invention, the network element, such as a switch or VLR, maintains two tables, a subscriber table that can contain subscriber data for each of several wireless subscriber stations, and a group table that can contain group data associated with a group of wireless subscriber stations. An HLR receives a request from a network element for information relating to a wireless subscriber station. In response to the request, the HLR obtains information relating to the subscriber station from the subscriber table and the group table, and sends to the network element at least one message that includes information based at least in part on the group data. According to one embodiment of this invention, the HLR generates and sends two messages to the network element. One message contains the information from the subscriber table, and the second message contains information from the group table. According to this aspect of the present invention, the protocol used to communicate between the HLR and the network element, such as IS-41 or GSM, may be enhanced to accommodate the communication of a group profile. By maintaining a group table for group data, the network element need only obtain group information for subscriber stations for which the network element does not already have a group profile. The use of a separate group table can decrease the amount of processing carried out by the HLR, because the HLR need not generate unified feature data. A separate group table can also be used to implement features on a customer-group only basis.

According to another embodiment of the present invention, a home location register is provided. The home location register includes a group table that can contain group data associated with a group of wireless subscriber stations. The HLR further includes a subscriber table that can contain subscriber data for each wireless subscriber station. The subscriber data for a particular wireless subscriber station includes feature data and a reference to group data associated with the wireless subscriber station. The home location register can receive a request from a network element for information relating to a wireless subscriber station. The HLR obtains group data referenced by the subscriber data associated with the wireless subscriber station from the group table. The HLR sends to the network element a message that includes information based at least in part on the contents of the group data referenced by the subscriber data.

The present invention implements customer group functionality in a wireless environment. According to one embodiment of the present invention, customer group functionality can be implemented in an existing wireless environment without modification of certain existing network elements, such as mobile switches and/or VLRs. Such functionality can greatly reduce service provider labor and costs incurred in provisioning subscriber stations, and can help reduce provisioning errors.

Still other advantages of the present invention will become apparent to those skilled in the art from the following description wherein there are shown and described preferred embodiments of this invention. As will be realized, the invention is capable of other different obvious aspects, all without departing from the invention. Accordingly, the drawings and description will be regarded as illustrative in nature and not as restrictive.

BRIEF DESCRIPTION OF THE DRAWINGS

The accompanying drawings incorporated in and forming a part of this specification, illustrate several aspects of the present invention, and together with the description serve to explain the principals of the present invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
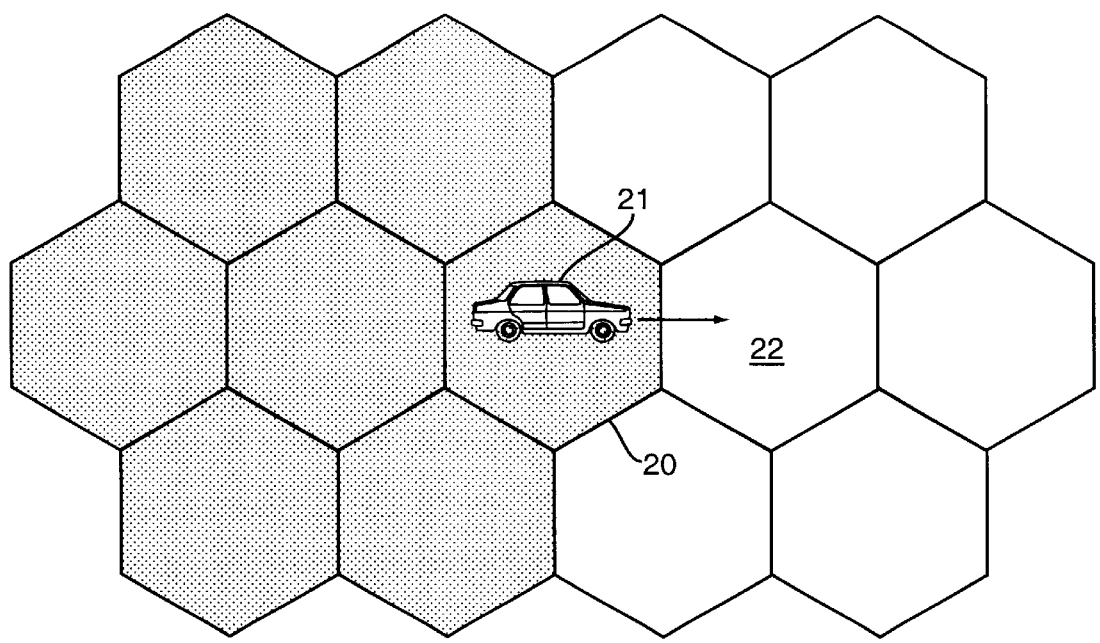
FIG. 1 is a diagram showing a wireless subscriber station roaming from a first service area to a second service area.

For purposes of illustration, FIGS. 1 and 2 will be discussed together. FIG. 1 is a diagram illustrating a service area 20 (illustrated by shaded cells), a service area 22

(illustrated by clear cells), and a wireless subscriber station 21. FIG. 2 is a diagram showing various components used to coordinate wireless communications within a particular service area, and for transferring wireless communications from one service area to another service area. It will be assumed for purposes of illustration that home location register (HLR) 24 is the HLR for both service areas 20 and 22, although it will be apparent to those skilled in the art that this is not a requirement of the present invention. It will be further assumed that mobile switching center (MSC) 26 and visitor location register (VLR) 30 are associated with service area 20, while MSC 28 and VLR 32 are associated with service area 22. The interaction between a public switched telephone network (PSTN) 25 and the MSCs 26, 28 is known to those skilled in the art and will not be discussed in detail herein.

Wireless subscriber station 21 comprises wireless equipment, such as an analog or digital wireless phone. Upon activation, subscriber station 21 sends a transmission to MSC 26, which in turn queries VLR 30 for information relating to wireless subscriber station 21. Location registers, such as HLR 24 and VLRs 30, 32, maintain information about a particular subscriber station in a record referred to as a profile. Each wireless subscriber station is associated with a particular HLR that is the HLR on which the subscriber station was initially provisioned and that maintains a permanent copy of the subscriber station's profile. The information in the profile can include, for example, the billing information associated with the subscriber station, and feature data indicating the features subscribed to by the wireless subscriber, such as, for example, calling number identification presentation, call forwarding, and distinctive ringing. A copy of the subscriber station's profile is also stored in the VLR associated with the service area in which the particular subscriber station last communicated.

Assuming VLR 30 does not currently contain a profile associated with subscriber station 21, VLR 30 sends a message to the HLR of subscriber station 21, HLR 24, requesting the profile associated with wireless subscriber station 21. In response to this request, HLR 24 sends VLR 30 a message containing the profile for subscriber station 21. VLR 30 stores the profile, and forwards the message to MSC 26. MSC 26 uses this message to update its data store regarding subscriber station 21. MSC 26 can now provide wireless service to subscriber station 21 so long as subscriber station 21 remains within service area 20.

Figure 2:
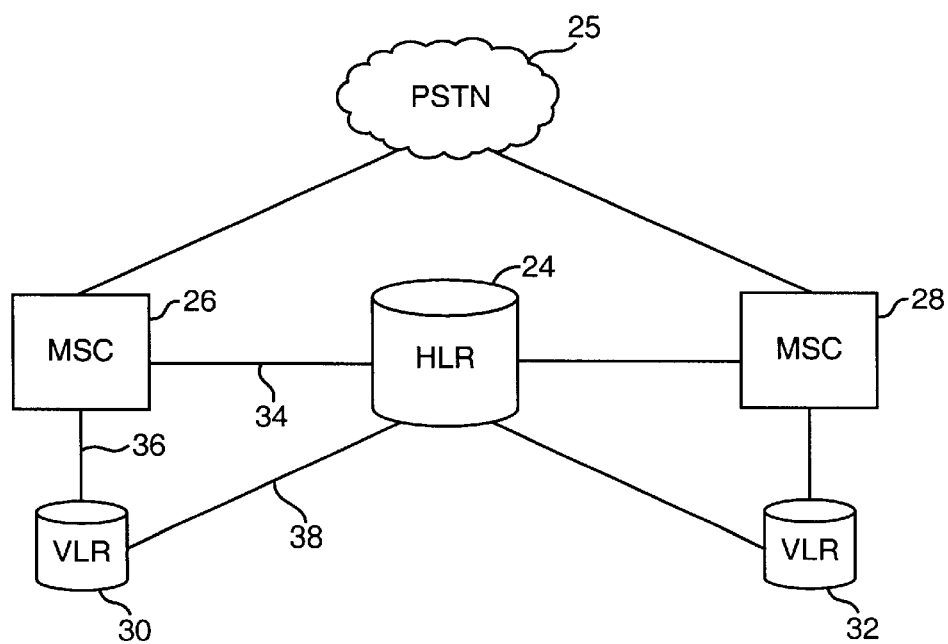
FIG. 2 is a diagram of components in a wireless environment or network.

FIG. 2 shows network components HLR 24, VLRs 30, 32 and MSCs 26, 28 as separate entities, with communication paths existing between pairs of components. For example, a path 36 is shown between MSC 26 and VLR 30 indicating a communications path between such components, and a path 38 indicates a communications path between VLR 30 and HLR 24. Typically, conventional protocols such as IS-41 and GSM are used to communicate between such components.

Frequently, however, network components are integrated into a single entity. For example, a VLR may be integrated with an MSC. In such equipment, the switch, in this case MSC 26, would typically handle communications between VLR 30 and HLR 24 such that there would not be a separate communications path 38 between VLR 30 and HLR 24. As another example, HLR 24 and VLR 30 may be integrated with MSC 26. In such an integrated component, if MSC 26 handles a call for a subscriber provisioned in HLR 24, no standards-based messaging protocol is required for communication between the integrated components. Thus, depending on the component implementation and level of integration, there may or may not be a separate physical communications path between the network components. The present invention can be used in any configuration, regardless of the level of integration, including, for example, the use of independent HLRs, MSCs and VLRs, the use of an independent HLR and an integrated VLR/MSC, and the use of an integrated HLR, VLR and MSC.

As subscriber station 21 roams from service area 20 to service area 22, communications must be transferred from MSC 26 to MSC 28. This process is referred to as a 'hand-off' and is known to those skilled in the art. During the hand-off, MSC 28 requests a profile for subscriber station 21 from VLR 32. If VLR 32 does not contain a profile for subscriber station 21, VLR 32 requests the profile from HLR 24. HLR 24 sends the requested profile to VLR 32 and informs VLR 30 that VLR 30 can delete its profile for subscriber station 21. VLRs 32 and 30 forward the messages they receive from HLR 24 to MSCs 26 and 28, respectively. MSCs 26 and 28 update their data for subscriber station 21 accordingly. Thus, HLR 24 acts as a central data repository for a wireless subscriber, such as subscriber station 21, and aids in the coordination of subscriber information between network elements when subscriber station 21 roams.

When a subscriber initially signs up for service from a service provider, an employee of the service provider provisions HLR 24 with the relevant information associated with subscriber station 21. Such information can include billing information and feature information such as the features to which the subscriber subscribes. In conventional HLRs, when a large number of subscriber stations that have similar or identical feature capabilities are provisioned, each subscriber station must be individually provisioned on HLR 24. This may occur, for example, when a company requests wireless service for a group of employees. The company requests that the station for each employee have identical features, such as call waiting, three-way calling, and call forwarding. In order to implement such features, the service provider provisions each subscriber station individually in a subscriber table maintained in HLR 24. The phrase 'table' as used throughout the specification and claims encompasses any suitable data structure operative to maintain information.

Figure 3:
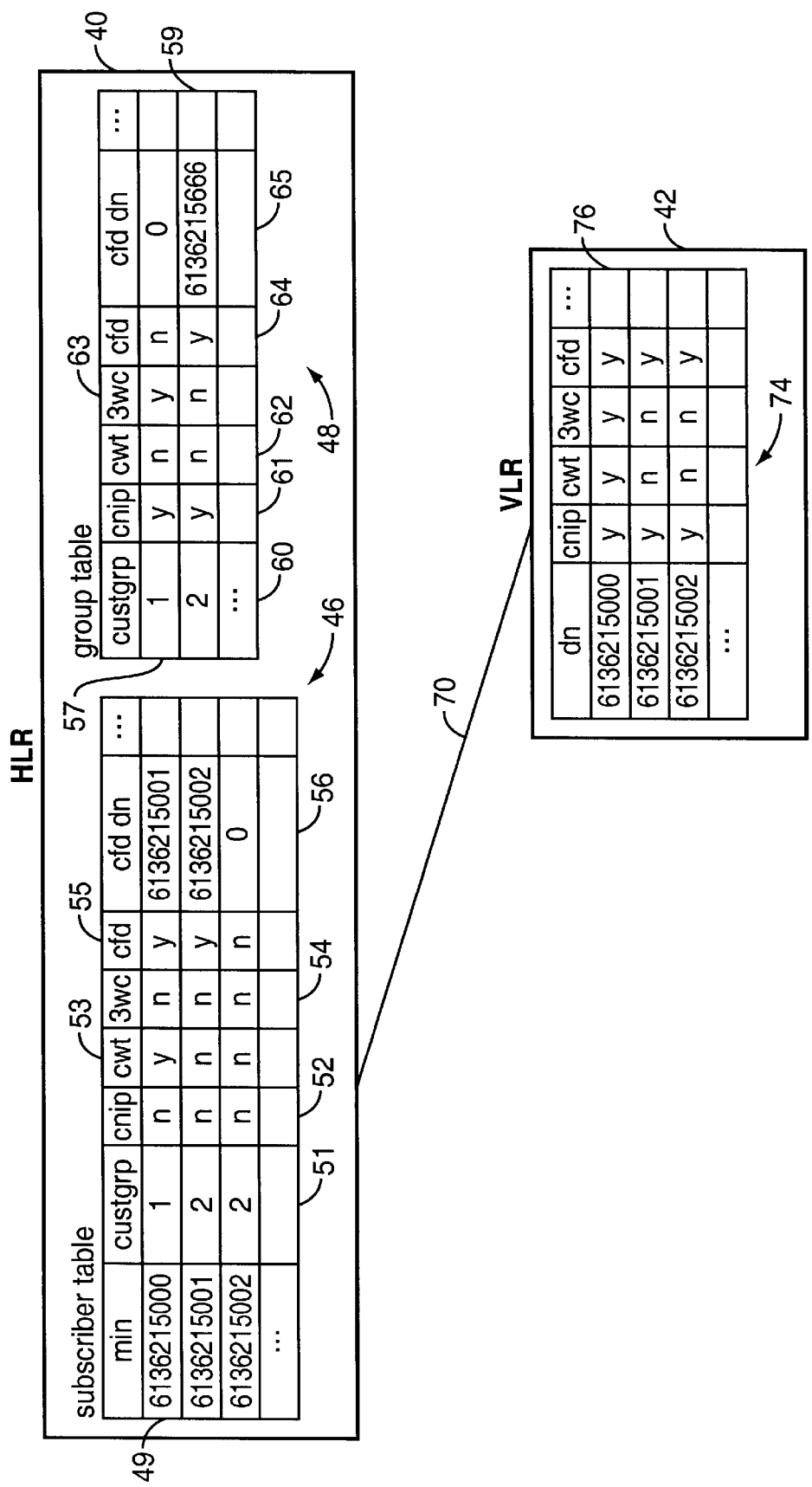
FIG. 3 is a block diagram illustrating an HLR and a VLR, and communications among such wireless environment components, according to one embodiment of the present invention.

FIG. 3 shows an HLR 40 having a subscriber table 46 and a group table 48 according to one embodiment of this invention. It is noted that the network components shown throughout the drawings illustrate only certain entities relevant for the discussion thereto. For example, FIGS. 3 and 4 do not illustrate a roaming table although the HLRs shown in such figures would likely contain a roaming table, and possibly other tables typically found in an HLR. Subscriber table 46 includes information about each individual subscriber station provisioned in HLR 40. Typically such information is maintained in individual records which are sometimes referred to as profiles. As shown in table 46, such information can include a mobile identification number ("min"), which is typically the phone number associated with the wireless subscriber station, and feature information such as calling number identification presentation ("cnip"), call waiting ("cwt"), three-way calling ("3wc"), and call forwarding ("cfd"). Associated with call forwarding is a call forwarding directory number ("cfd dn"). Additional features could comprise, for example, message waiting and voice mail. Additional information associated with each subscriber station can include billing and other relevant information. Subscriber table 46 also includes a column 51 for identifying whether a respective subscriber station is associated with a customer group ("custgrp"). Such information comprises a reference, such as a numerical index, that uniquely identifies a group profile in a group table in the HLR. For example, subscriber station 49 (min '6136215000') is associated with customer group number 1, as shown in column 51.

The index '1' uniquely identifies a particular group profile in group table 48. It should be assumed that with respect to FIGS. 3–10, each figure is independent of the others, and the feature data represented in the tables may be inconsistent across figures.

Group table 48 contains a record, or profile, of information for each respective customer group. Such information will be sometimes referred to herein as a group profile. Each group profile contains feature information associated with the subscriber stations that are members of that respective customer group. For example, row 57 illustrates the entries contained in the profile associated with customer group 1. Such profile contains feature data for calling number identification presentation, call waiting, three-way calling, and call forwarding. Such feature data indicates that each subscriber station associated with customer group 1 has calling number identification presentation and three-way calling activated, as illustrated by columns 61 and 63, respectively. Similarly, each subscriber station associated with customer group 2 will have calling number identification presentation and call forwarding activated, as illustrated by row 59.

Upon a request by a network element, such as VLR 42, for information about a particular subscriber station, such as subscriber station 49, HLR 40 accesses subscriber table 46 and obtains the profile associated with subscriber station 49. HLR 40 determines that subscriber station 49 is associated with customer group 1 (from the "custgrp" data), and reads the group profile shown in row 57 from group table 48. HLR 40 combines the profiles from subscriber table 46 and group table 48 into at least one message and sends this message via path 70 to VLR 42. This unified profile can be stored in VLR 42 as illustrated by row 76 of subscriber table 74. Thus, while the subscriber profile of subscriber station 49 indicates that subscriber station 49 is provisioned for only call waiting and call forwarding, because customer group 1 also includes calling number identification presentation and three-way calling, the unified profile associated with subscriber station 49 indicates each of such features are activated, i.e., calling number identification presentation, call waiting, three-way calling, and call forwarding.

Although the communication has been described as occurring between HLR 40 and VLR 42, in those implementations where the VLR is integrated with a switch (MSC), the communications could be between the HLR and MSC. In those implementations where the VLR is external to the MSC, the VLR could communicate directly with the HLR, and would typically receive a message from the HLR, update the VLR's database as described above, and then forward the message(s) to the serving MSC. The MSC would then update its data about the subscriber station. It is to be understood that the present invention has applicability in integrated MSC/VLR components as well as external MSC/VLR components. Thus although communication may be described herein as occurring between an HLR and VLR, if the VLR is integrated with the MSC, it should be understand that such communication actually takes place between the HLR and MSC/VLR component.

Figure 4:
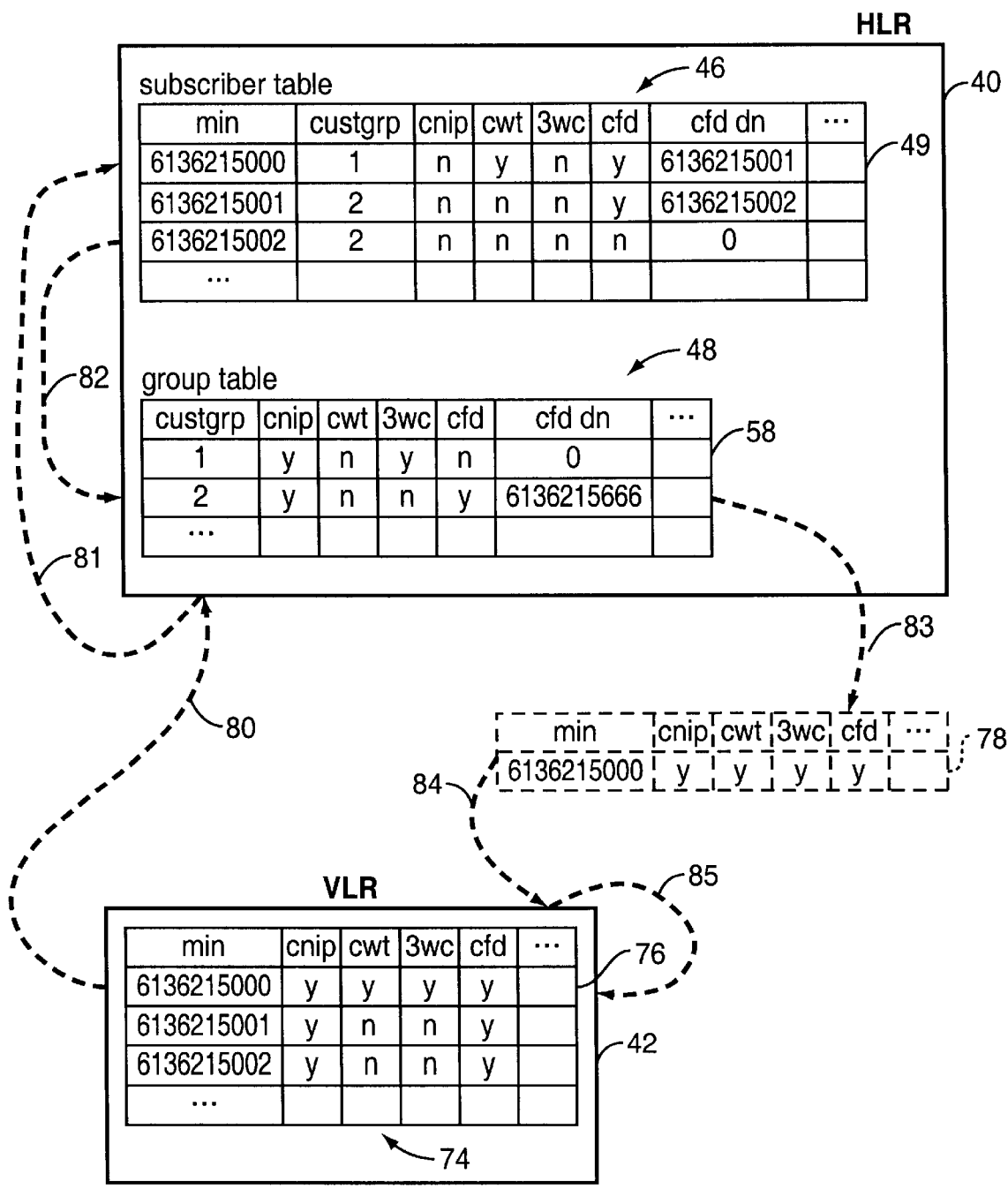
FIG. 4 is a block diagram illustrating a flow of processing for implementing customer group functionality in a wireless environment, according to one embodiment of this invention.

FIG. 4 is a diagram illustrating in greater detail a process for communicating group information in a wireless environment, according to one embodiment of the present invention, that can occur when a wireless service subscriber activates wireless equipment, such as a wireless phone, in a service area. Upon activation of the phone, VLR 42 requests from HLR 40 the profile associated with the subscriber station, as indicated by arrow 80. For purposes of this example, it will be assumed that the respective subscriber station has a mobile identification number (MIN) of '6136215000'. At the time of this initial request, row 76 does not exist in VLR 42. As illustrated by arrow 81, HLR 40 receives this request and obtains the appropriate profile from subscriber table 46, which is referenced by row 49. HLR 40 determines that the subscriber profile includes a reference to customer group 1, and accesses group table 48 to obtain the customer group profile associated with customer group 1, as illustrated by arrow 82. HLR 40 obtains the appropriate group profile from row 58, and generates a unified profile from the feature information from the subscriber profile (row 49) and the group profile (row 58). The unified profile is illustrated in dashed outline as message 78. As reflected by message 78, the profile indicates that the subscriber subscribes to each of calling number identification presentation, call waiting, three-way calling, and call forwarding. This profile represents a 'union' of the subscriber profile from row 49 in which the call waiting and call forwarding features are activated, and the group profile from row 58 in which the calling number identification presentation and three-way calling features are activated. This message is sent to VLR 42, as illustrated by arrow 84, and stored in VLR 42 as row 76, as illustrated by arrow 85. The MSC integrated with VLR 42 can now provide services to the respective subscriber station, including the calling number identification presentation, call waiting, three-way calling, and call forwarding features.

In this manner, customer group functionality can be implemented in a wireless environment. Because HLR 40 combines the subscriber profile with the group profile to create a unified profile reflecting the features enabled in each profile, conventional components such as a mobile switching center and/or a VLR need not be modified to implement such customer group functionality. Such customer group functionality can greatly ease the provisioning effort that would otherwise be necessary for provisioning a large number of wireless subscriber stations, and reduce the likelihood of an error in such provisioning.

Figure 5:
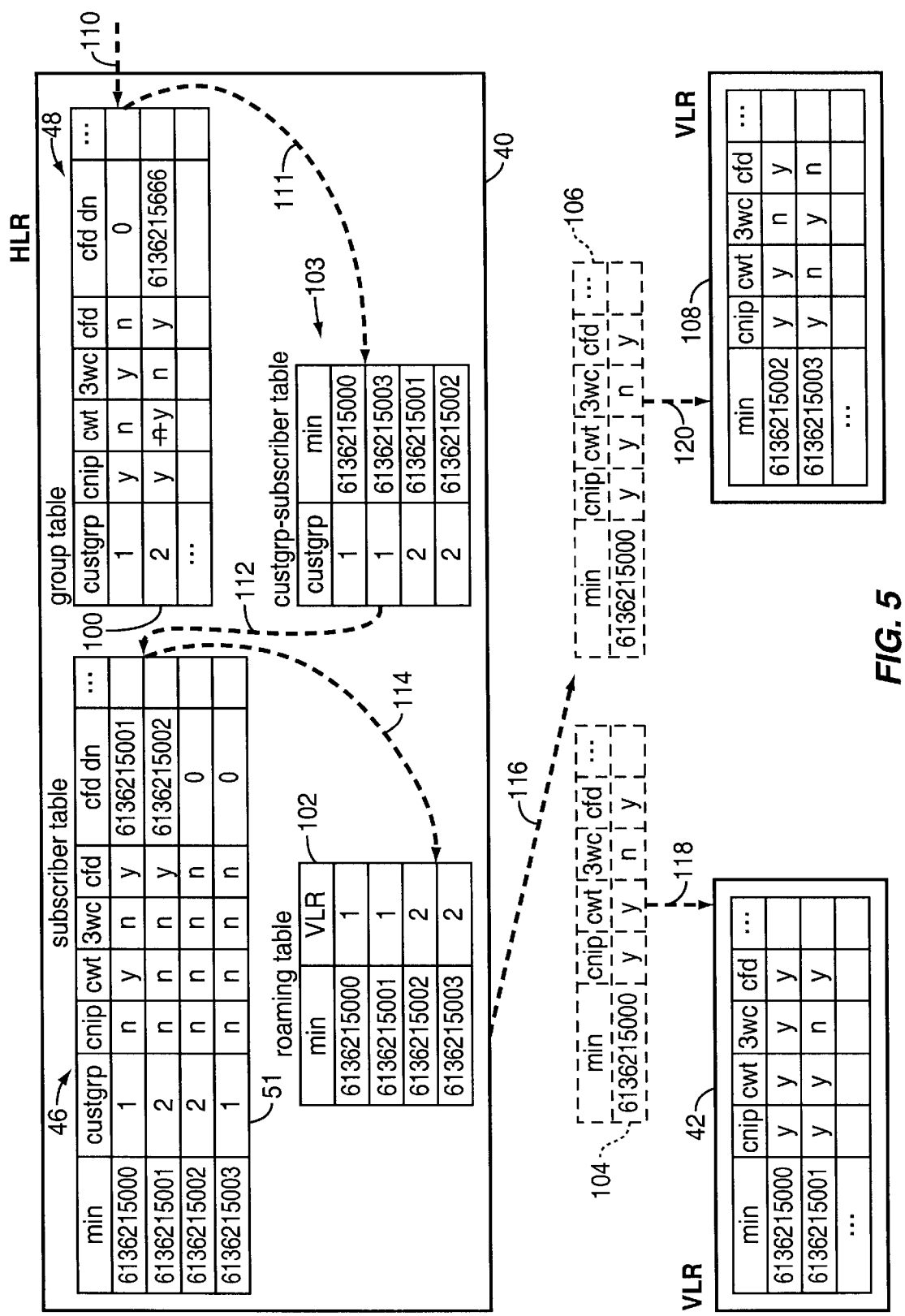
FIG. 5 is a block diagram illustrating a propagation of a customer group table modification to various VLRs, according to one embodiment of this invention.

FIG. 5 is a block diagram illustrating a process according to one embodiment of the present invention for propagating to various VLRs changes made to a group table. Arrow 110 reflects a modification being made to group table 48, and specifically to customer group number 2 as illustrated in row 100. In particular, the call waiting feature information has been modified to indicate that all subscriber stations associated with customer group 2 will have call waiting activated. Upon such modification, HLR 40 will determine which wireless subscriber stations are associated with customer group 2, as illustrated by arrow 111. HLR 40 can determine this, for example, by maintaining a cross reference table such as customer-subscriber index 103 that cross-references subscriber mobile identification numbers (mins) with their associated group profile number. In the example illustrated, mins 6136215001 and 6136215002 are associated with customer group 2. As illustrated by arrows 112 and 114, this information can be used to access subscriber table 46, and roaming table 102, to determine which VLR is currently servicing which subscriber station. For the sake of brevity, mobile identification numbers (mins) will be referenced by their least significant four digits hereinafter. As illustrated by roaming table 102, subscriber station 5001 is being serviced by VLR 1, while subscriber station 5002 is being serviced by VLR 2. As represented by arrow 116, HLR 40 creates a unified profile for each affected wireless subscriber station. Message 104 reflects the unified profile for wireless subscriber station 5001. For such subscriber station, calling number identification presentation, call waiting, and call forwarding will now be activated. These features are a union of the features activated for the subscriber station in the subscriber profile in table 46 and the group profile in group table 48. Similarly, message 106 reflects the unified profile for subscriber station 5002, again the unification of the feature data from subscriber table 46 and group table 48. These messages are sent to VLR 42 and VLR 108, respectively, as indicated by arrows 118 and 120. The information is stored in the VLRs, and the mobile switch centers associated with the VLRs can now provide these features to the respective subscriber stations.

Figure 6:
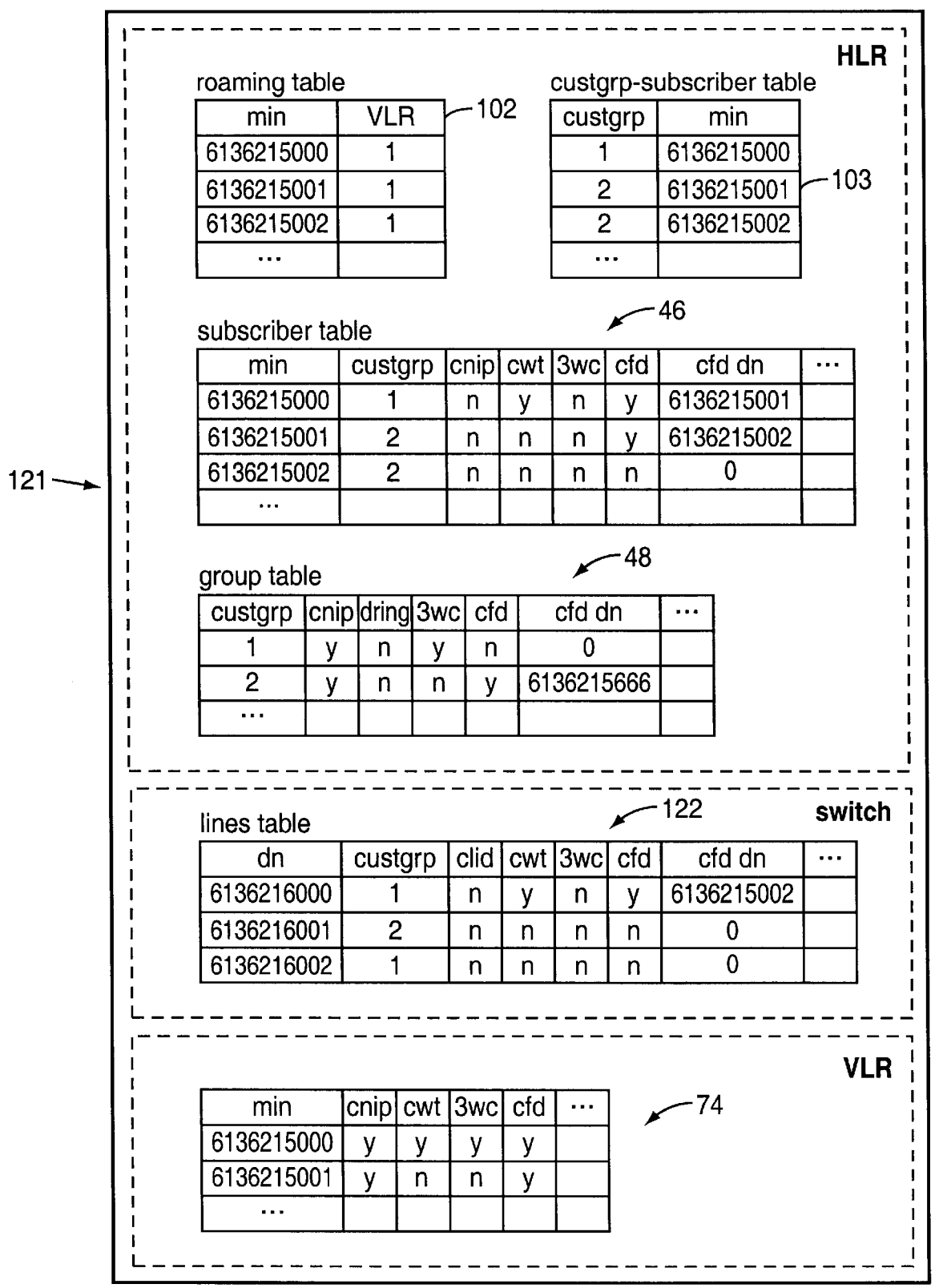
FIG. 6 is a block diagram illustrating customer group functionality being implemented in a combination wireline/wireless switch, according to one embodiment of this invention.

According to another embodiment of the present invention, a combination wireless/wireline switch can share access to a single group table to implement coordinated group functionality across both wireless and wireline subscriber stations. FIG. 6 illustrates such a combined wireless/wireline switch 121. Switch 121 contains an integrated HLR and VLR used for wireless functionality, and also provides wireline functionality. According to the present invention, lines table 122 maintains information relating to wireline phones. HLR tables 46, 102, and 103, and VLR subscriber table 74 maintain information relating to wireless phones as discussed previously. Group table 48 includes group information that is used by both the wireless and the wireline switch functionality to implement customer group functionality in each environment. With regard to wireless functionality, the information stored in VLR subscriber table 74 is derived from tables in one or more HLRs, such as HLR subscriber table 46 and group table 48, as described previously. With regard to wireline functionality, the feature information relating to a wireline phone is a combination of the feature data maintained in lines table 122 and that maintained in group table 48. The ability to share group information across wireline and wireless subscriber stations can reduce the datafill that would otherwise be necessary to provide identical group functionality to wireless and wireline subscriber stations.

In a combined wireline/wireless switch, the switch can determine how group feature data applies to wireless and wireline subscribers. For example, in wireless provisioning the ability to display the phone number of the calling party may be referred to as calling number identification presentation (CNIP), and in wireline provisioning it may be referred to as CLID, or calling line identification display. Where a wireline subscriber station does not subscribe to CLID but is associated with a customer group that subscribes to CNIP, the switch may either consider CNIP as a wireless only service, or it may consider it equivalent to CLID and provide the wireline subscriber with CLID functionality.

Figure 7:
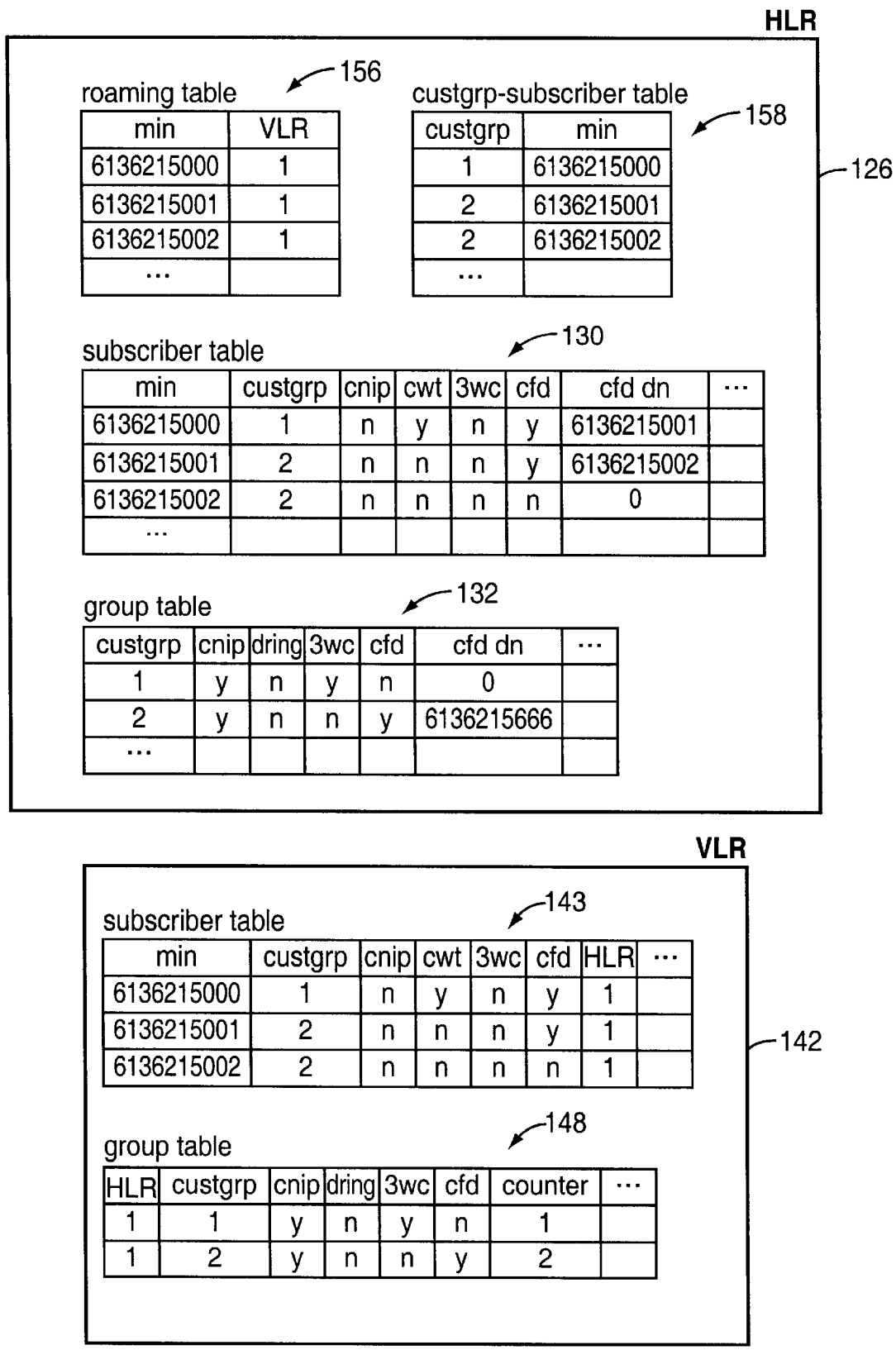
FIG. 7 is a block diagram illustrating an HLR and VLR, according to another embodiment of this invention.

According to another embodiment of the present invention, group functionality is implemented in a wireless environment in part by maintaining subscriber and group profiles in both the HLR and a network element such as a MSC or VLR. As necessary, the network element, such as a VLR, can request either the subscriber profile, the group profile, or both profiles from the appropriate HLR. The VLR loads the subscriber profile information into the subscriber table and the group profile information into the group table. Such components are shown in FIG. 7. An HLR 126 has a subscriber table 130 and a group table 132. Subscriber table 130 and group table 132 contain feature information relating to wireless service features as discussed previously. HLR 126 also includes a roaming table 156 that tracks the VLR currently serving a particular subscriber station. HLR 126 includes an index 158 that cross-references customer groups and subscribers. VLR 142 contains a subscriber table 143, similar to that discussed above with reference to FIGS. 3–5, and a group table 148. Group table 148 contains the group data, or profiles, associated with the subscriber stations that VLR 142 currently services.

Figure 8A:
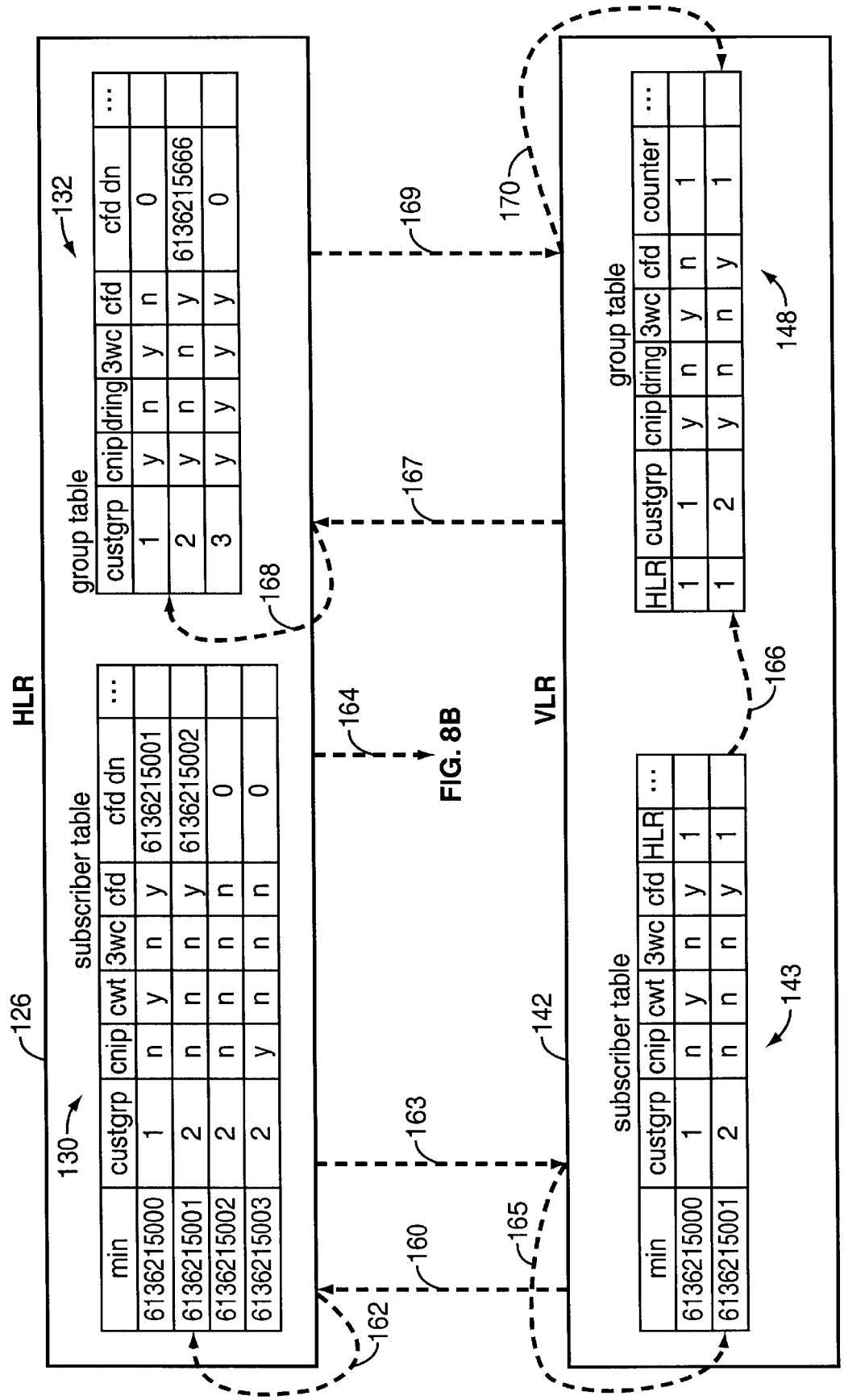
FIGS. 8A–8B illustrate a process for updating a VLR when a wireless subscriber station roams from one service area to another service area, according to one embodiment of this invention.
Figure 8B:
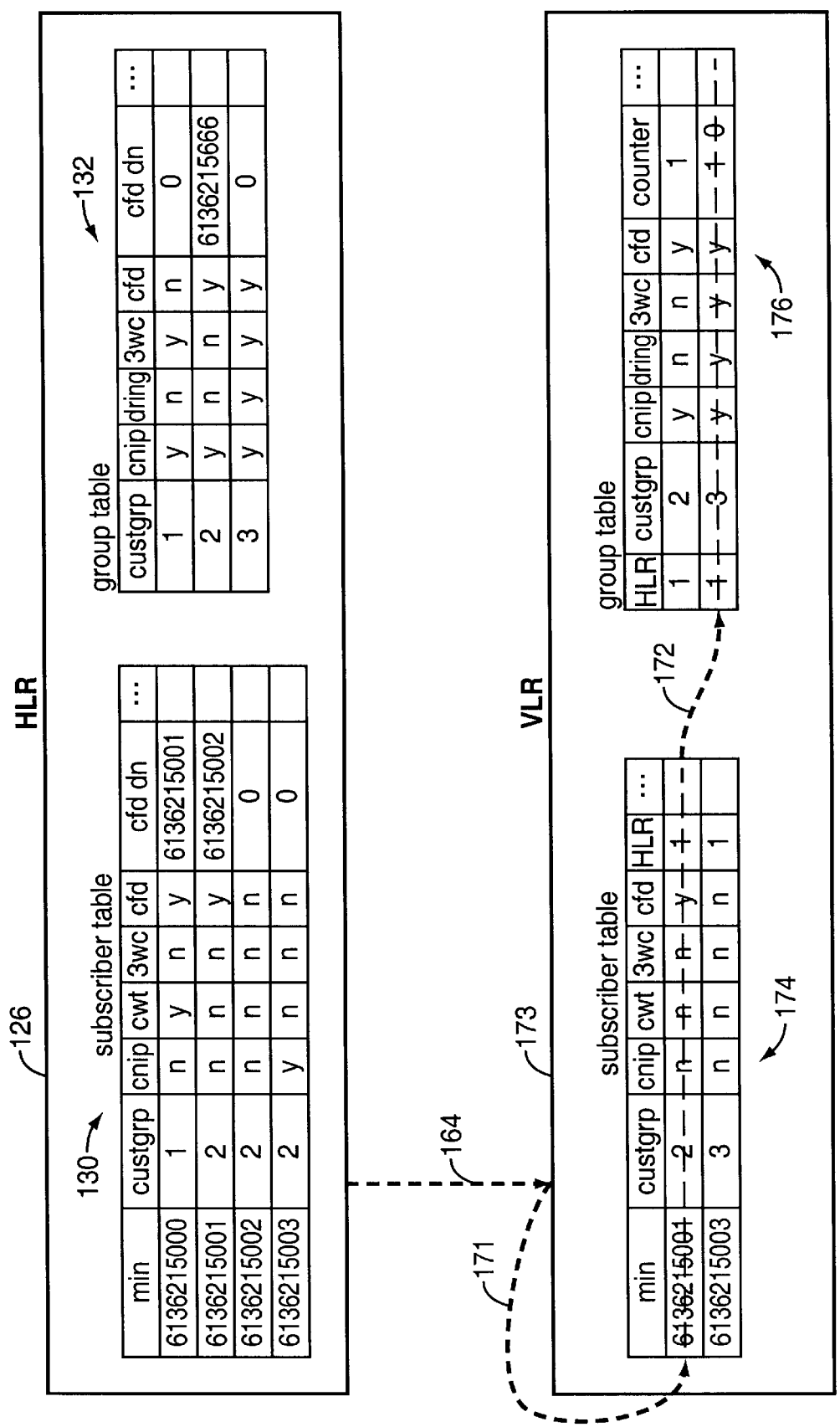

FIGS. 8A–8B are a block diagram illustrating a process by which a VLR requests and receives a group profile for a wireless subscriber station. As the subscriber roams into the area serviced by VLR 142, VLR 142 requests a profile for mobile identification number ("min") 6136215001 from HLR 126, as represented by arrow 160. For the sake of brevity, mins will be referred to by their least significant four digits. At this point, the bolded entry for MIN 5001 does not exist in table 143. As represented by arrow 162, HLR 126 accesses subscriber table 130 and obtains a subscriber profile for MIN 5001. HLR 126 generates a subscriber message that contains the subscriber profile for MIN 5001 and sends such message to VLR 142, as represented by arrow 163. HLR 126 also sends a registration cancellation message to the VLR that previously serviced MIN 5001, as represented by arrow 164, and as discussed below with reference to FIG. 8B.

As represented by arrow 165, VLR 142 inserts the information from the subscriber profile into subscriber table 143, as illustrated by the bold text associated with MIN 5001 in subscriber table 143. VLR 142 determines if MIN 5001 is associated with a group profile, and if so, whether group table 148 contains the relevant group profile associated with MIN 5001, as represented by arrow 166. According to this invention, a VLR can contain subscriber profiles from different HLRs. Consequently, two separate subscriber profiles associated with unrelated group profiles could contain identical group profile numbers, or indexes. One way to uniquely identify a group profile is to use both the group profile number and an HLR identifier associated with the respective subscriber. Thus, as shown in group table 148, each group profile contains the customer group number ("custgrp" column), which may not be unique across different HLRs, as well as a unique HLR identifier ("HLR" column). An HLR identifier can comprise, for example, the switch number of the switch associated with the HLR and the system identification (SID).

VLR 142 uses the customer group number and HLR information associated with MIN 5001 to determine if group table 148 contains the group profile associated with MIN 5001. For purposes of illustration, it will be assumed that group table 148 does not contain the associated profile. As illustrated by arrow 167, VLR 142 requests the group profile from HLR 126. HLR 126 accesses group table 132 and obtains the appropriate profile, as represented by arrow 168. HLR 126 then packages this profile into a group message, and, as illustrated by arrow 169, sends the message to VLR 142. VLR 142 inserts the requested group profile into group table 148, as illustrated by arrow 170, and as reflected by the bolded entry in group table 148.

Referring now to FIG. 8B, arrow 164 represents HLR 126 sending a registration cancellation message to VLR 173 notifying the VLR that the subscriber station having MIN 5001 has left the service area of VLR 173. As illustrated by arrow 171, VLR 173 deletes the profile associated with MIN 5001 from subscriber table 174, as represented by the dashed lines through such profile. According to one embodiment of the present invention, a VLR will not delete a group profile until there are no subscriber stations associated with the respective profile being serviced by the VLR. One mechanism for tracking such usage is to maintain a counter on each group profile. Such a counter is represented in the 'counter' column in group table 176. The counter is decremented when a subscriber profile associated with the group profile is deleted from subscriber table 174, and incremented when a subscriber profile associated with the group is added to subscriber table 174. When the counter reaches zero, the group profile can either be deleted immediately, or can be deleted after a certain amount of time has elapsed.

Arrow 172 represents VLR 173 accessing group table 176 and decrementing the counter associated with the group profile that is associated with MIN 5001. Because the counter is now 0, there are no subscriber stations being serviced by VLR 173 that are associated with this respective group profile. VLR 173 can therefore delete the group profile from group table 176, as represented by the dashed lines through the respective profile.

Referring again to FIG. 7, one aspect of this embodiment of the present invention is that features can be associated with either the subscriber table 130, the group table 132, or with both tables. For example, the call waiting feature, as represented by the column labeled 'cwt,' only exists in subscriber table 130. Thus, call waiting is a feature that can only be provisioned against an individual subscriber station. Similarly, the distinctive ringing feature, as indicated by the 'dring' column of group table 132, can only be provisioned against a group of subscriber stations. However, other features such as calling number identification presentation 'cnip', or three-way calling '3wc', can be provisioned against either the subscriber table or the group table.

Figure 9:
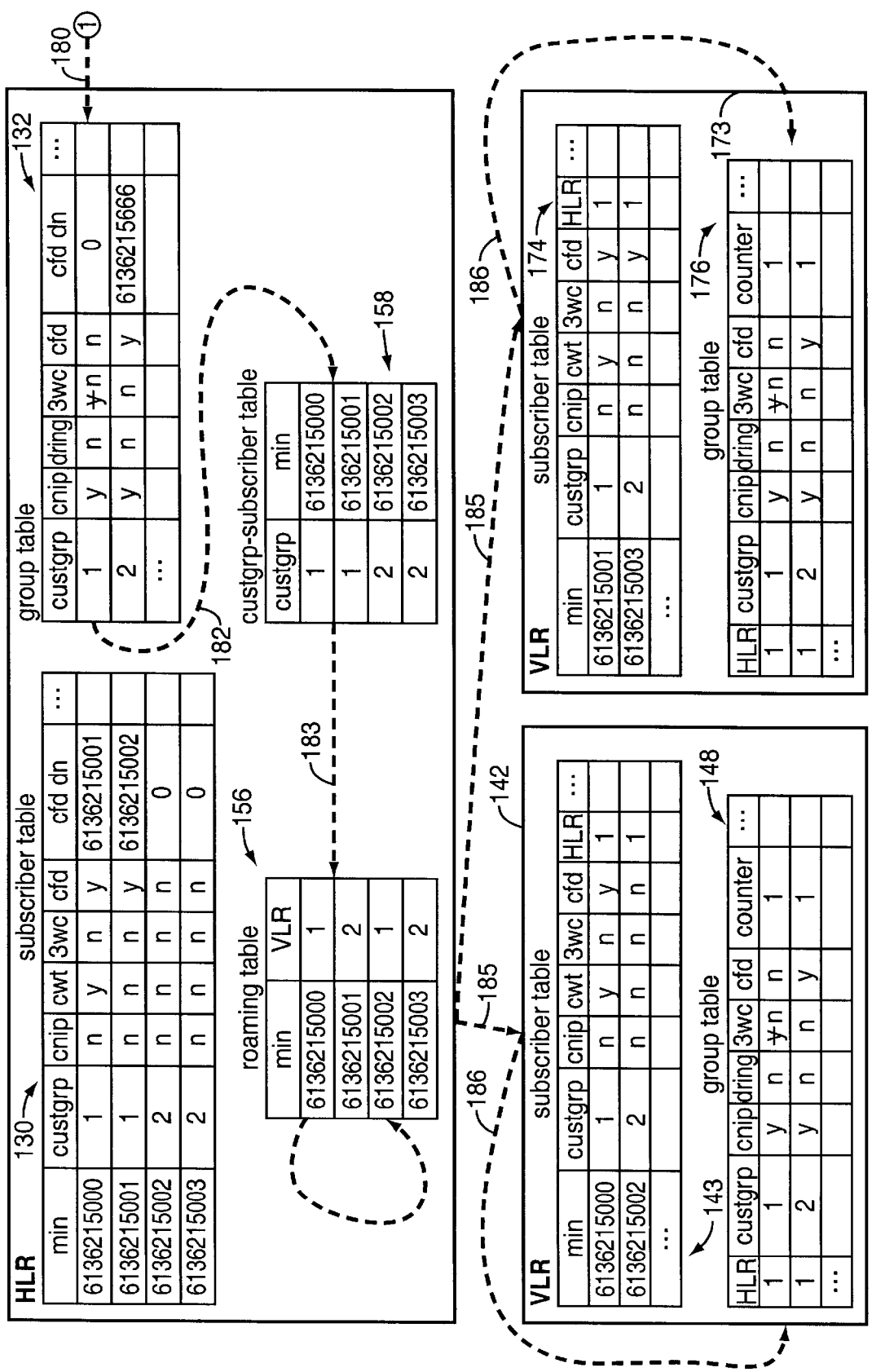
FIG. 9 is a block diagram illustrating a process for updating a customer group in an HLR and propagating the changes to a plurality of VLRs, according to one embodiment of the present invention.

Referring now to FIG. 9, a block diagram is shown illustrating a process according to one embodiment of this invention for updating a customer group in an HLR and propagating the update to VLRs that maintain separate subscriber and group tables. Arrow 180 represents an update being made to group table 132, specifically the three-way calling '3wc' feature is being disabled for customer group 1, as represented by a strike-out through the letter 'y' in the '3wc' column. HLR 126 accesses the index table 158, as represented by arrow 182, to determine which MINs are associated with customer group 1. HLR 126 then accesses roaming table 156 to determine what VLR currently services the MINs within customer group 1, as represented by arrow 183. HLR 126 generates a message including the new profile associated with the respective customer group, or representing the update made to the customer group, and sends this message to the appropriate VLRs, in this example VLRs 142 and 173, as represented by arrows 185. VLRs 142 and 173 update the group profile in the respective group table, as indicated by the bold text in the '3wc' column in group tables 148 and 176. Such VLRs will no longer provide the three way calling feature to all subscriber stations associated with the respective customer group.

One mechanism for implementing group tables in a VLR and communicating such information between a VLR and HLR is through the use of predefined message formats. Although such messages are not currently defined in standard messaging protocols, such as IS-41 or GSM, such protocols could be enhanced to include such messages, or existing message formats could be 'borrowed' for such purposes. For example, a Customer Group Profile Request message can be generated by the VLR and sent to the HLR when a VLR requires information relating to a particular customer group. Such message would include a customer group number identifying the customer group of interest. A Customer Group Profile Request Response message can be generated by the HLR in response to a Customer Group Profile Request. Such response message would include the customer group number and the respective group profile. A Customer Group Update Message can be generated and sent from the HLR to the affected VLRs when an update occurs to a customer group in an HLR. Such message could include a customer group number of the affected customer group and the updated group profile. It is apparent that other types of messages could be used to communicate such information between the HLR and VLR. Moreover, while the communications have been discussed as occurring between an HLR and an integrated VLR, in those situations where the VLR is external to the MSC, such communications can occur between the HLR and the VLR and between the VLR and the MSC.

Figure 10:
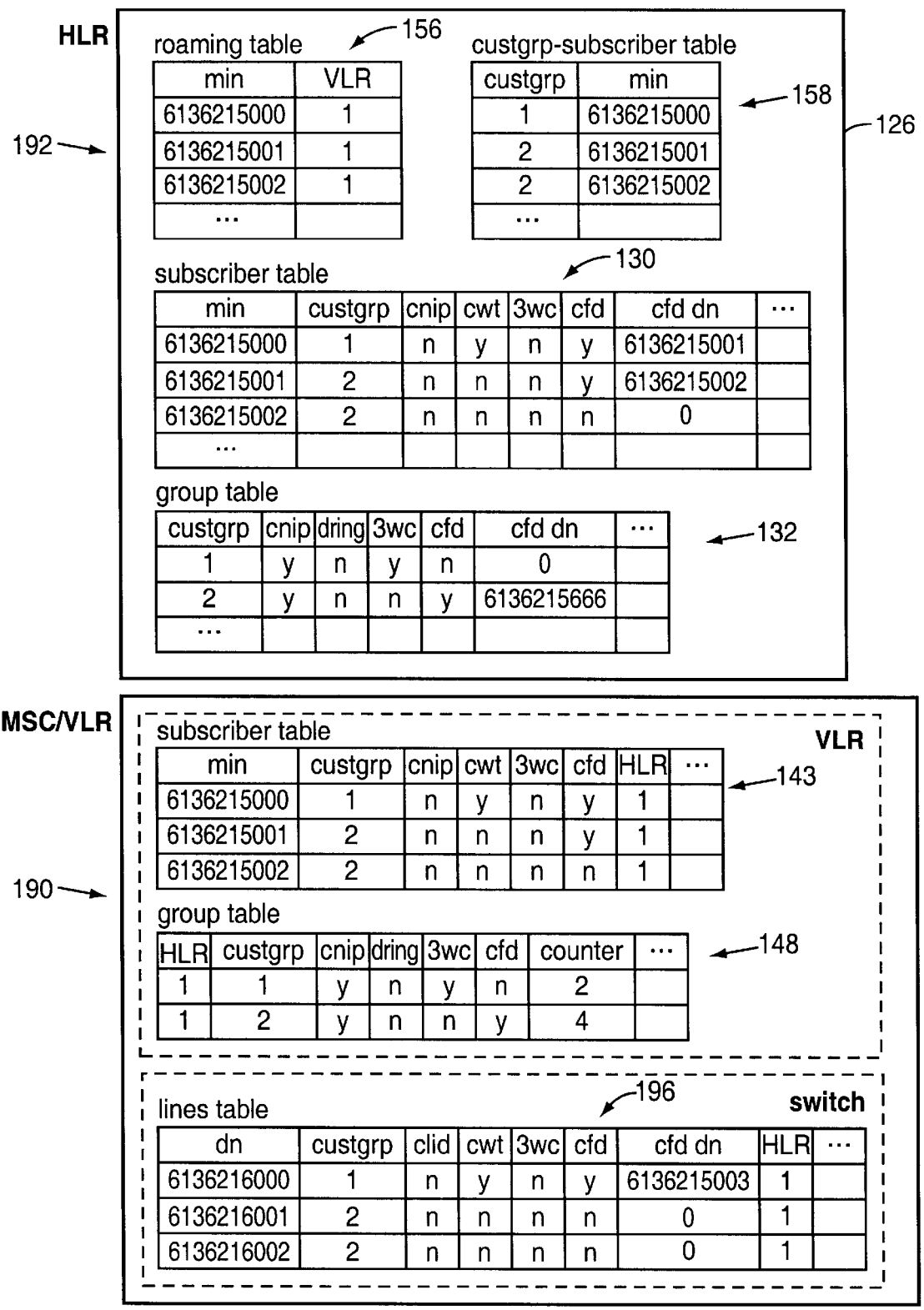
FIG. 10 is a block diagram illustrating customer group functionality being implemented in a combination wireline/wireless switch, according to another embodiment of this invention.

According to another aspect of this invention, a group table is maintained in an integrated combined wireline/wireless switch 190, as shown in FIG. 10. The advantages of allowing a wireline switch to share the customer group table information in a combined wireless/wireline switch have been discussed with regard to FIG. 6. Unlike the system shown in FIG. 6, the VLR shown in FIG. 10 utilizes a separate group table 148. Both the subscriber table 143 and lines table 196 contain an HLR field and a customer group field ("custgrp" column) to associate the respective subscriber station with a particular customer group. Thus, wireline and wireless subscriber stations can use the same customer group. The use of the group table by the wireline switch adds some complexity to maintaining the counter field of group table 148. To ensure group records are not deleted prematurely, the counter field should account for both wireless and wireline stations. The counter should be incremented when a wireless station roams into the area serviced by switch 190 and when a new wireline subscriber station is added, and should be decremented when a wireless station roams out of the service area and when a wireline station is taken out of service. Where wireline provisioning creates a line which belongs to a customer group not recognized by switch 190, the provisioning service would request the group profile from HLR 192.

The foregoing description of preferred embodiments of the invention has been presented for purposes of illustration. It is not intended to be exhaustive or to limit the invention to the precise form disclosed. Obvious modifications or variations are possible in light of the above teachings. The embodiments were chosen and described in order to best illustrate the principals of the invention and its practical application to thereby enable one of ordinary skill in the art to best utilize the invention and various embodiments and with various modifications as are suited to the particular use contemplated. It is intended that the scope of the invention be defined by the claims appended hereto.

What is claimed is:

1. A method for implementing customer group functionality, comprising:

establishing a group table being operative to contain group data associated with at least one group of wireless subscriber stations, wherein the group data comprises feature data associated with the at least one group of wireless subscriber stations;

establishing a subscriber table being operative to contain subscriber data for a plurality of wireless subscriber stations, the subscriber data for a respective wireless subscriber station including feature data;

receiving a request from a network element for information relating to a wireless subscriber station;

obtaining subscriber data associated with the wireless subscriber station from the subscriber table;

obtaining from the group table group data referenced by the subscriber data associated with the wireless subscriber station;

combining the obtained group data and the obtained subscriber data into a combined data message; and sending to the network element at least one combined data message, wherein the information in the at least one combined data message comprises unified feature data derived from the feature data from the subscriber data associated with the wireless subscriber station and the feature data from the group data referenced by the subscriber data;

wherein the feature data indicates whether a respective feature is enabled, and wherein the unified feature data for a respective feature is derived by examining feature data from the subscriber data and feature data from the group data and if the respective feature is indicated as enabled in at least one of feature data from the subscriber data and feature data from the group data, the unified feature data for the respective feature is indicated as enabled.

2. A method according to claim 1, wherein the network element is a mobile switching center.

3. A method according to claim 1, wherein the network element is a visitor location register.

4. A method according to claim 1, further comprising maintaining for each group record a counter operative to indicate a number of wireless subscriber stations associated with the respective group record and being serviced by the network element.

5. A method according to claim 1, wherein the subscriber data for a respective wireless subscriber further comprises a reference to group data associated with the respective wireless station and wherein the unified feature data is determined by examining subscriber data associated with the respective wireless subscriber station and feature data from the group data referenced by the subscriber data.

6. A method for implementing customer group functionality, comprising:

establishing a group table being operative to contain group data associated with at least one group of wireless subscriber stations, wherein the group data comprises feature data associated with the at least one group of wireless subscriber stations, and wherein feature data indicates whether a respective feature is enabled;

establishing a subscriber table being operative to contain subscriber data for a plurality of wireless subscriber stations, the subscriber data for a respective wireless subscriber station including feature data;

receiving a request from a network element for information relating to a wireless subscriber station;

obtaining subscriber data associated with the wireless subscriber station from the subscriber table;

obtaining from the group table group data referenced by the subscriber data associated with the wireless subscriber station;

combining the obtained group data and the obtained subscriber data into a combined data message; and sending to the network element at least one combined data message comprising unified feature data derived for a respective feature by examining feature data from the subscriber data and feature data from the group data and if the respective feature is indicated as enabled in at least one of feature data from the subscriber data and feature data from the group data, the unified feature data for the respective feature is indicated as enabled.

7. A method according to claim 6, wherein the subscriber data for a respective wireless subscriber further comprises-a reference to group data associated with the respective wireless station and wherein the unified feature data is determined by examining subscriber data associated with the respective wireless subscriber station and feature data from the group data referenced by the subscriber data.

8. A method according to claim 7, wherein the network element is a mobile switching center.

9. A method according to claim 7, wherein the network element is a visitor location register.

10. A method according to claim 7, further comprising maintaining for each group record a counter operative to indicate a number of wireless subscriber stations associated with the respective group record and being serviced by the network element.

11. A system comprising:

a group table being operative to contain group data associated with at least one group of wireless subscriber stations wherein the group data comprises feature data associated with the at least one group of wireless subscriber stations, said feature data indicating whether a respective feature is enabled;

a subscriber table being operative to contain subscriber data for each of a plurality of wireless subscriber stations, the subscriber data for a respective wireless subscriber station including feature data; and a home location register (HLR) being operative to:

receive a request from a network element for information relating to a wireless subscriber station;

obtain subscriber data associated with the wireless subscriber station from the subscriber table;

obtain group table group data referenced by the subscriber data associated with the subscriber station; and send to the network element at least one combined data message comprising unified feature data derived for respective features by determining if the respective features are indicated as enabled in the feature data associated with the subscriber data or the feature data associated with the group data and if the respective feature data is indicated as enabled in at least one of feature data from the subscriber table and feature data from the group table, the unified feature data for the respective feature is indicated as enabled.

12. A system according to claim 11, wherein the subscriber data for a respective wireless subscriber further comprises a reference to group data associated with the respective wireless station and wherein the unified feature data is determined by examining subscriber data associated with the respective wireless subscriber station and feature data from the group data referenced by the subscriber data.

13. A system according to claim 12, wherein the network element is a mobile switching center.

14. A system according to claim 12, wherein the network element is a visitor location register.

15. A system according to claim 12, further comprising maintaining for each group record a counter operative to indicate a number of wireless subscriber stations associated with the respective group record and being serviced by the network element.

* * * * *